Sept. 1, 1964   M. MUCKLENBECK ETAL   3,146,646
PROCESS AND APPARATUS FOR MACHINING ARCUATE
BODIES OF ROUND CROSS-SECTION
Filed July 24, 1961   8 Sheets-Sheet 1
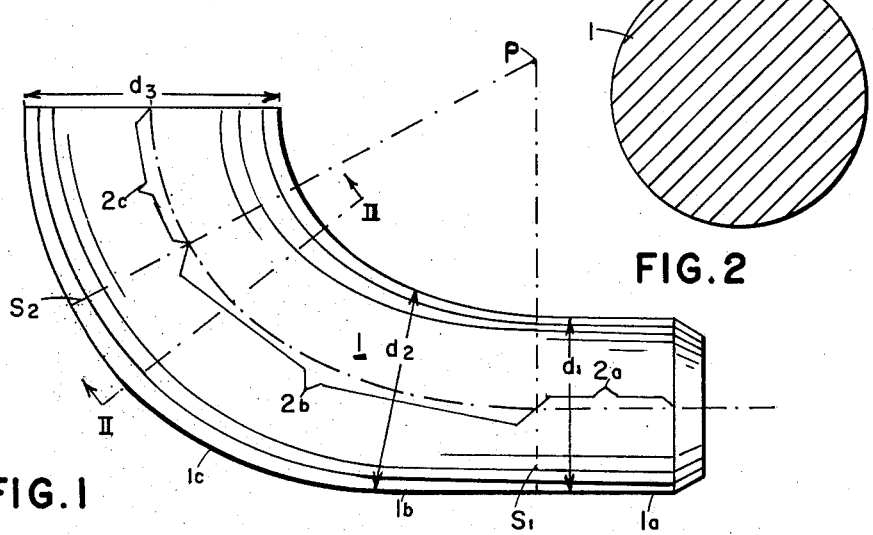
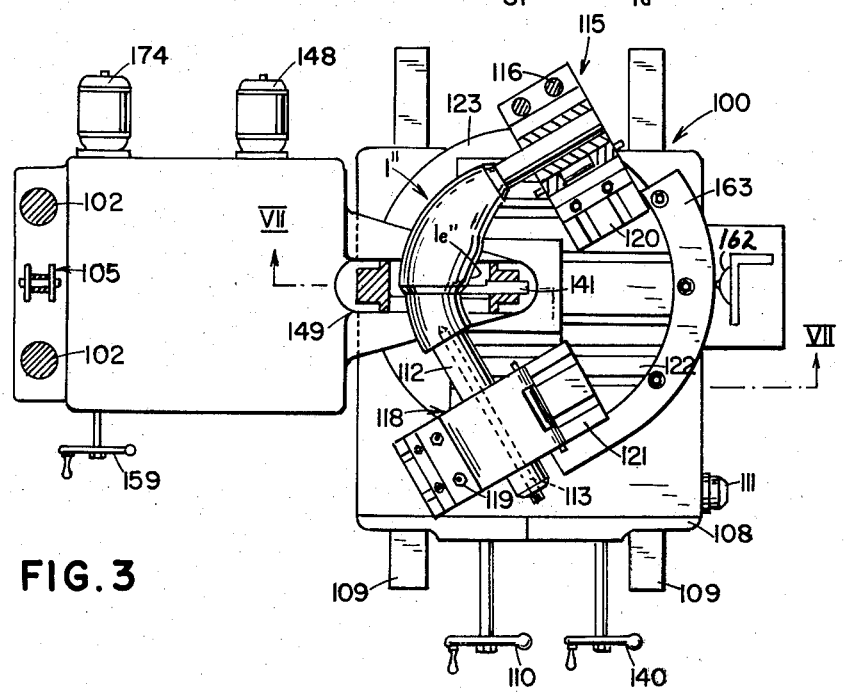
Max Mucklenbeck
Erhard Müller
INVENTORS.
BY [signature]
AGENT.

Max Mucklenbeck
Erhard Müller
INVENTORS.

INVENTORS:
Max Mucklenbeck
Erhard Müller
BY
AGENT.

Sept. 1, 1964    M. MUCKLENBECK ETAL    3,146,646
PROCESS AND APPARATUS FOR MACHINING ARCUATE
BODIES OF ROUND CROSS-SECTION
Filed July 24, 1961    8 Sheets-Sheet 5

Max Mucklenbeck
Erhard Müller
INVENTORS.

BY  *Karl F. Ross*

AGENT.

Max Mucklenbeck
Erhard Müller
INVENTORS

BY *Karl F. Ross*

AGENT.

Sept. 1, 1964          M. MUCKLENBECK ETAL          3,146,646
       PROCESS AND APPARATUS FOR MACHINING ARCUATE
                 BODIES OF ROUND CROSS-SECTION
Filed July 24, 1961                              8 Sheets-Sheet 7

Max Mucklenbeck
Erhard Müller
INVENTORS.

BY  Karl F. Ross

AGENT.

United States Patent Office 3,146,646
Patented Sept. 1, 1964

3,146,646
PROCESS AND APPARATUS FOR MACHINING ARCUATE BODIES OF ROUND CROSS-SECTION
Max Mucklenbeck and Erhard Müller, Bezirk Cologne, Germany, assignors to Schmidt & Clemens, Bezirk Cologne, Germany, a corporation of Germany
Filed July 24, 1961, Ser. No. 126,333
8 Claims. (Cl. 82—14)

The present invention relates to the manufacture of arcuate bodies of round cross-section and, more particularly, to a process and an apparatus for machining pipe-bending mandrels and similar generally trumpet-shaped members.

Curved bodies of round cross-section in general and, more specifically, pipe-bending mandrels and the like of relatively complicated curvature have hitherto been formed as cast or forged blanks which were hand-finished to the desired shapes and tolerances. Pipe- and tube-bending mandrels of conventional types, designed to bend elongated tubular bodies to precise angles with predetermined optimum curvature and cross-section, usually have a substantially cylindrical end portion and successive curved portions with different radii of curvature whereby a pipe or tube may be bent through an angle of, say, 90°. The pipe or tube is urged onto and drawn over the aforementioned mandrels by suitable power means (preferably hydraulic pressure devices). The successive curved portions, which merge more or less gradually into one another, are advantageously of a cross-sectional diameter progressively increasing from the cylindrical end portion toward the other extremity of the mandrel whereby the bent pipe or tube will have a final radius of curvature approximately equal to that of the mandrel at the latter extremity. Moreover, it is desirable that cross-sectional planes through these curved portions along their respective radii of curvature intercept the mandrel in substantially circular sections for optimum fluid flow through the resulting pipe or tube.

It will be readily apparent that bending mandrels of the aforedescribed character, whose radius of curvature either remains constant or varies continuously or in steps, are exceedingly costly and difficult to manufacture, owing to the necessity for using special measuring and layout templates and the inadequacy of conventional machine tools in processing curved blanks of annular cross-section.

It is the principal object of this invention, therefore, to provide a process and an apparatus for machining arcuate bodies of round cross-section which obviates the disadvantages of hitherto existing devices for and methods of producing such bodies.

A more specific object of the invention is to provide a process for reproducibly shaping arcuate bodies of circular or elliptical cross-section having successive portions with different radii of curvature.

Yet a further object of the present invention is the provision of an apparatus suitable for the automatic or semi-automatic machining of complex arcuate blanks of the character referred to adapted to afford precise control over its configuration.

Still another object of our invention resides in the provision of improved means for producing curved bodies of progressively increasing substantially circular cross-sectional area.

Another object of our present invention is to provide a process and apparatus for machining pipe- and tube-bending mandrels suitable for the production of simple bends as well as of spiral, helical and other complex bends.

In accordance with the invention, a process for machining a preferably roughed-out or preformed blank of approximately the desired mandrel configuration, but with oversize dimensions, comprises principally the steps of swinging the blank about a predetermined center of curvature in the plane of its center line and concurrently surfacing or machining (e.g. by grinding or milling) the periphery of the blank, at a rate which is high compared with the angular velocity of its swing, in a generally transverse plane fixedly positioned relatively to the center of curvature and preferably passing through it. Thus, the blank surface is machined along a tight, curved helix whose turns may be made to vary in radius according to the thickness of the finished piece required at successive cross-sections thereof. In the preferred case, in which circular rather than elliptical cross-sections are desired, each turn of the helix is substantially perpendicular to a plane which is tangent to the outer periphery of the helix envelope at such turn. Usually the blank will be generally trumpet-shaped, i.e. its radius of curvature decreases while its cross-sectional diameter increases. If the change in radius of curvature is gradual, the center of curvature shifts toward the blank along the evolute of its center line; if it is in steps, such shift occurs advantageously along one or more radii so that the transition between successive arcs will be smooth. The curved body or mandrel may be formed with a straight (i.e. cylindrical) portion at one or both extremities thereof by a linear displacement of the blank prior to and/or upon completion of the curvilinear motion imparted to the blank, the machining along these extremities following a straight helical or helicoidal path in a plane which may or may not be perpendicular to the axis of the cylindrical portion so that, again, circular or elliptical cross-sections may be produced.

According to another aspect of this invention, we provide an apparatus for machining mandrel blanks and the like which includes support means for a blank swingable about a pivot which is automatically or manually shiftable past a working position defined by the plane of an orbiting machining tool and, advantageously, in a direction transverse to that plane, whereby the aforementioned cylindrical or arcuate portions may be machined. The cutting tool revolves about the periphery of the workpiece in continuous engagement therewith, means being provided for maintaining the center of revolution of the tool at least approximately at the geometrical center of the area of intersection of the workpiece by the plane of the tool. Thus, the workpiece may be formed with a substantially perfectly circular cross-section although the radius of curvature of the center line of the mandrel may be continuously changing or may vary by predetermined and discrete increments at successive locations along the curvilinear portions of the center line.

The machining tool, which may comprise, for example, a rotatable grindstone or a cutter dispersed along a radius of the workpiece section being shaped, is, according to a more particular feature of the invention, shiftable by automatic or manually controlled feed means toward and away from the center of the workpiece in order to adjust the depth of cut and, thereby, the cross-sectional diameter of the finished piece. The feed means advantageously includes a differential drive adapted to permit adjustment of the tool feed while the machining tool revolves about the workpiece.

Moreover, in accordance with another feature of this invention, the workpiece support and the tool carrier may be relatively displaced in the orbital plane, but in a direction transverse to the plane of displacement of the aforementioned pivot, to shape mandrels for helically coiled tubes and other workpieces having non-planar curved center lines. Generally, the workpiece will be swung about a substantially vertical axis and the radius of curvature of its center line will be varied by a horizontal shift of the workpiece pivot relative to the cutting tool which revolves in a substantially vertical plane. For mandrels adapted to form helically coiled tubes, therefore, the tool and the workpiece may be relatively displaced substantially vertically. The several displacements of workpiece and tool may, advantageously, be controlled by templates or cams coupled to the swinging workpiece for accurate and automatic feed adjustment.

The above and other objects, features and advantages of our invention will become more readily apparent from the following description, reference being made to the accompanying drawing in which:

FIG. 1 is a plan view of a pipe-bending mandrel adapted to be formed in accordance with the invention;

FIG. 2 is a cross-sectional view taken along line II—II of FIG. 1;

FIG. 3 is a top-plan view of an apparatus for machining arcuate bodies such as the mandrel shown in FIG. 1;

Figure 8:
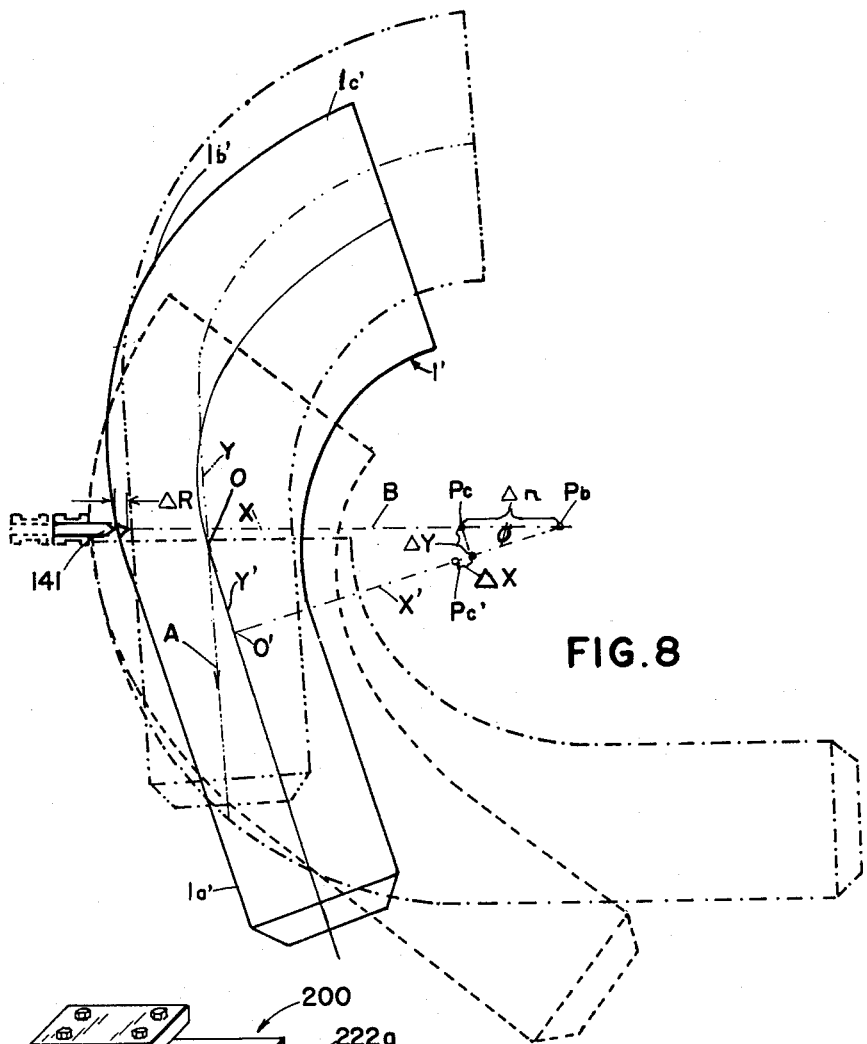
FIG. 8 is a diagram illustrating the operation of the apparatus of the preceding figures.

In FIGS. 1 and 2 we show a trumpet-shaped bending mandrel 1 adapted to be formed by our process and with the apparatus described hereinafter from an oversized blank. The latter may be cast, forged or otherwise preshaped in any convenient manner. The mandrel 1 comprises a cylindrical terminal portion 1a having a constant cross-sectional diameter $d_1$ and a straight center line 2a. When the finished mandrel is used for bending pipe, the pipe to be bent is forced initially onto the cylindrical portion 1a and then drawn over the remainder of the mandrel. The cylindrical portion 1a thus merges at section $S_1$ into a transition portion 1b, of progressively increasing cross-sectional diameter $d_2$, whose center line 2b is an arcuate extension of center line 2a. The terminal portion 1c of the mandrel has again a constant diameter $d_3$ corresponding to the final inner diameter of the pipe drawn thereover and merges with the transition portion 1b at section $S_2$. In the particular mandrel under consideration, the center lines 2b, 2c of the arcuate intermediate and terminal portions 1b, 1c thereof are circular arcs having the same radius of curvature and a center of curvature located at a point P. In accordance with our process, therefore, the mandrel may be finished by swinging it in an arc about the point P and machining its periphery as described in greater detail hereinafter. Other mandrels, e.g. those having non-constant radii of curvature, are also machinable as indicated below; one such mandrel is illustrated in FIG. 8.

In FIGS. 3–7 we show a machine for finishing mandrels of the type illustrated in FIG. 1. The machine 100 comprises a tool support 101 which is vertically shiftable along a pair of stationary guides 102; this support is counterbalanced by a counterweight 103 guided between vertical rails 104 and connected to the support 101 via chain 105. The latter passes over suitable deflecting sprockets, two of which are indicated at 106. A handwheel 107 and a motor 174 are coupled to suitable rack-and-pinion means, not shown, to raise and lower the tool support 101, relatively to its guiding columns 102.

A transversely shiftable carriage 108 is slidable upon a pair of fixed horizontal rails 109 by a handwheel 110 coupled to one of the rails by another rack-and-pinion linkage. A lever 111 along a side of the carriage serves to lock the latter in conventional manner against transverse displacement. The workpiece 1 has its large-diameter terminal portion secured to a bar 112 by a bolt 113 while its cylindrical shank 1a is clamped between the jaws 114a, 114b of a clamp block 115 by bolts 116. The bar 112 is likewise secured between jaws 117a, 117b of a clamp block 118 by bolts 119. The clamp blocks 115, 118 are adjustably mounted on respective plates 120, 121 provided with the usual T-slots, the plates in turn being adjustably disposed on a T-slotted workpiece-support plate 122. The latter is carried by and longitudinally shiftable on a turntable 123 which is provided with ball rollers 124 at its lower surface; these ball rollers support the table 123 on the upper surface 125 of the carriage 108. The table 123 also carries a motor 126 whose pinion 127 meshes with a rack 128, formed on the undersurface of workpiece-support plate 122, and is journaled on an upright stud 129 whose axis constitutes the center of swing of the workpiece. Stud 129 is narrowly confined and flattened at 129a for only longitudinal displacement in a slot 130 provided in the carriage 108 and is fixed in a hub 171 slidable on a platform 175. Hub 171 is secured to a rack 131, shiftable along platform 175, which meshes with the pinion 132 of a motor 133 on carriage 108 adapted to displace the stud, the table 123 and the plate 122 longitudinally. Turntable 123 is generally circular (as shown in FIG. 3) and provided with a peripheral rack 134 engaged by the pinion 135 of a motor 136. The latter is mounted on a bracket 137 supported, in its turn, on a rod 138 which extends from hub 171 and passes through a guide aperture 173 in carriage 108, the entire assembly 136–138 being thus supported by platform 175 for movement with the stud 129 along slot 130 under the control of motor 133. A handwheel 140 is coupled via a further conventional rack-and-pinion transmission, not shown, on table 123, to the workpiece-support plate 122 for manual adjustment thereof relative to the table 123 so as to reciprocate the plate 122 in the general direction of slot 130 when the table is in the angular position (FIG. 7) which it occupies upon transition from straight to curved shaping or vice versa, i.e. during machining of section $S_1$ (FIG. 1).

Figure 4:
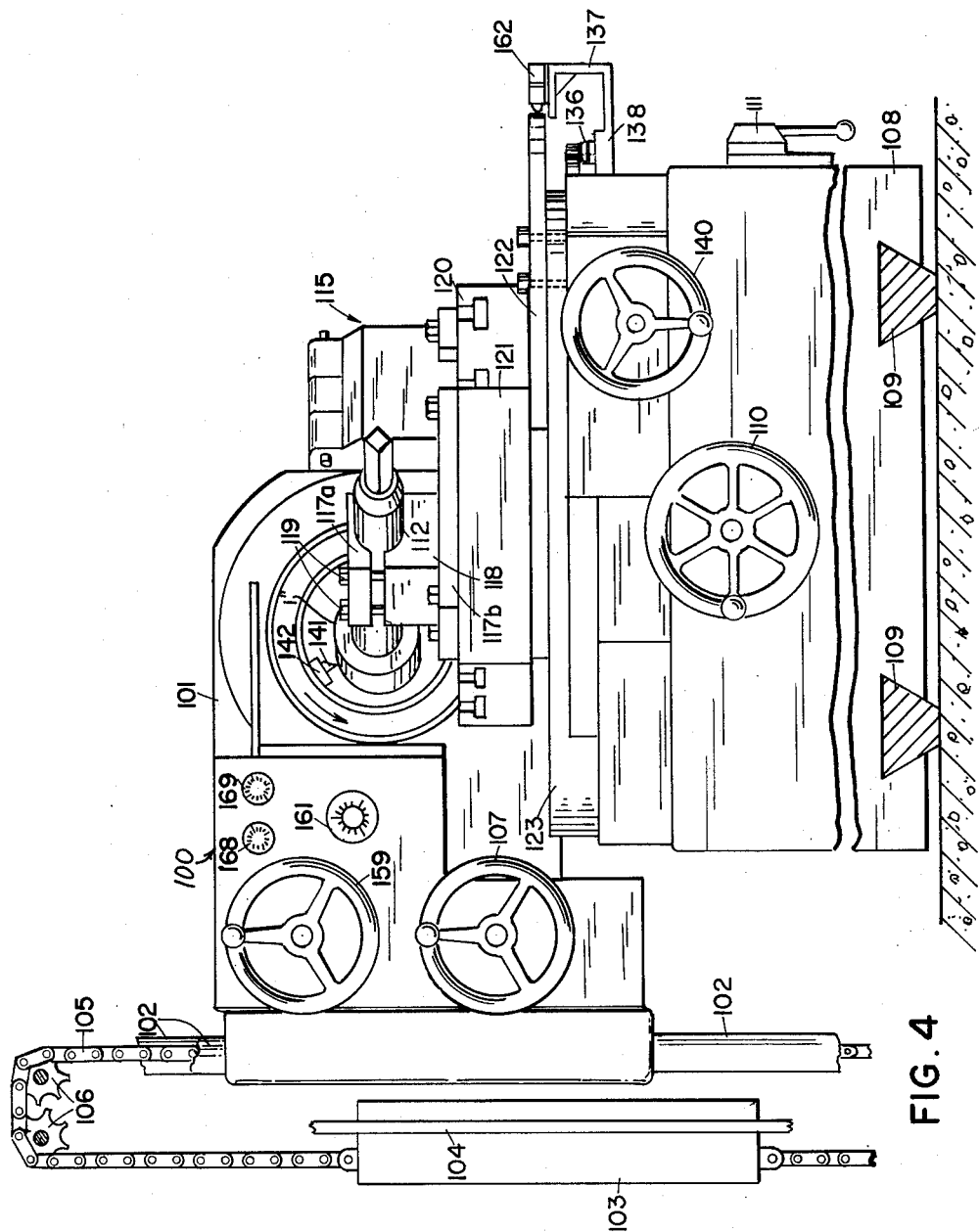
FIG. 4 is a side-elevational view of the apparatus of FIG. 3.
Figure 5:
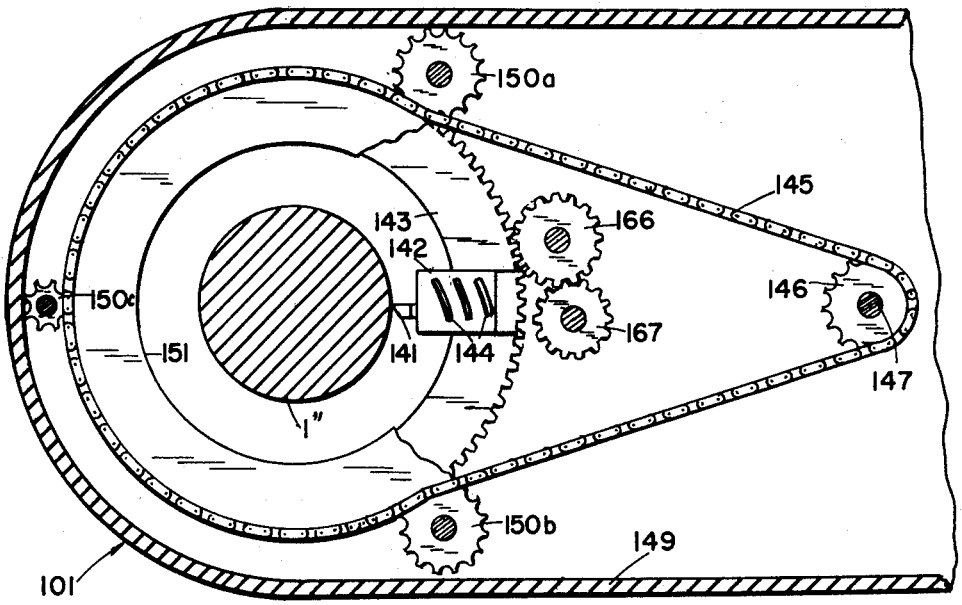
FIG. 5 is a cross-sectional detail view, drawn to an enlarged scale, of the tool holder of the apparatus of FIGS. 3 and 4.
Figure 6:
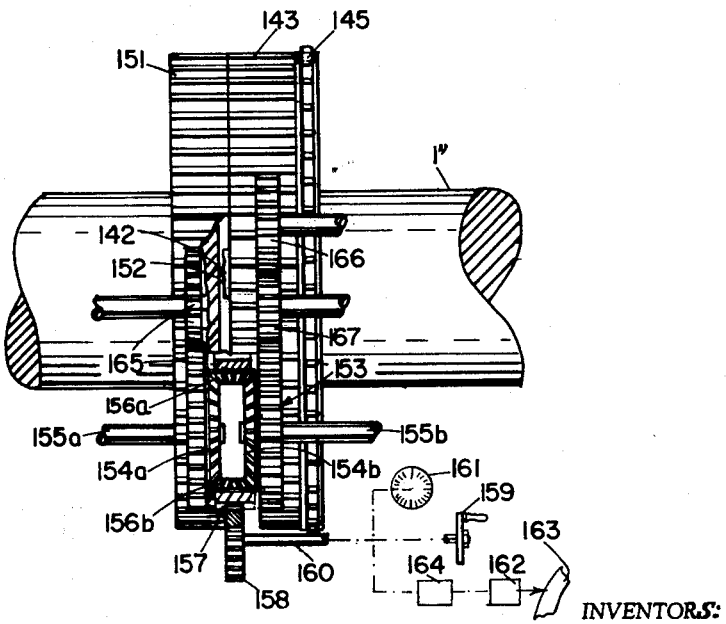
FIG. 6 is a plan view showing, somewhat schematically, the feed mechanism for the tool holder.
Figure 7:
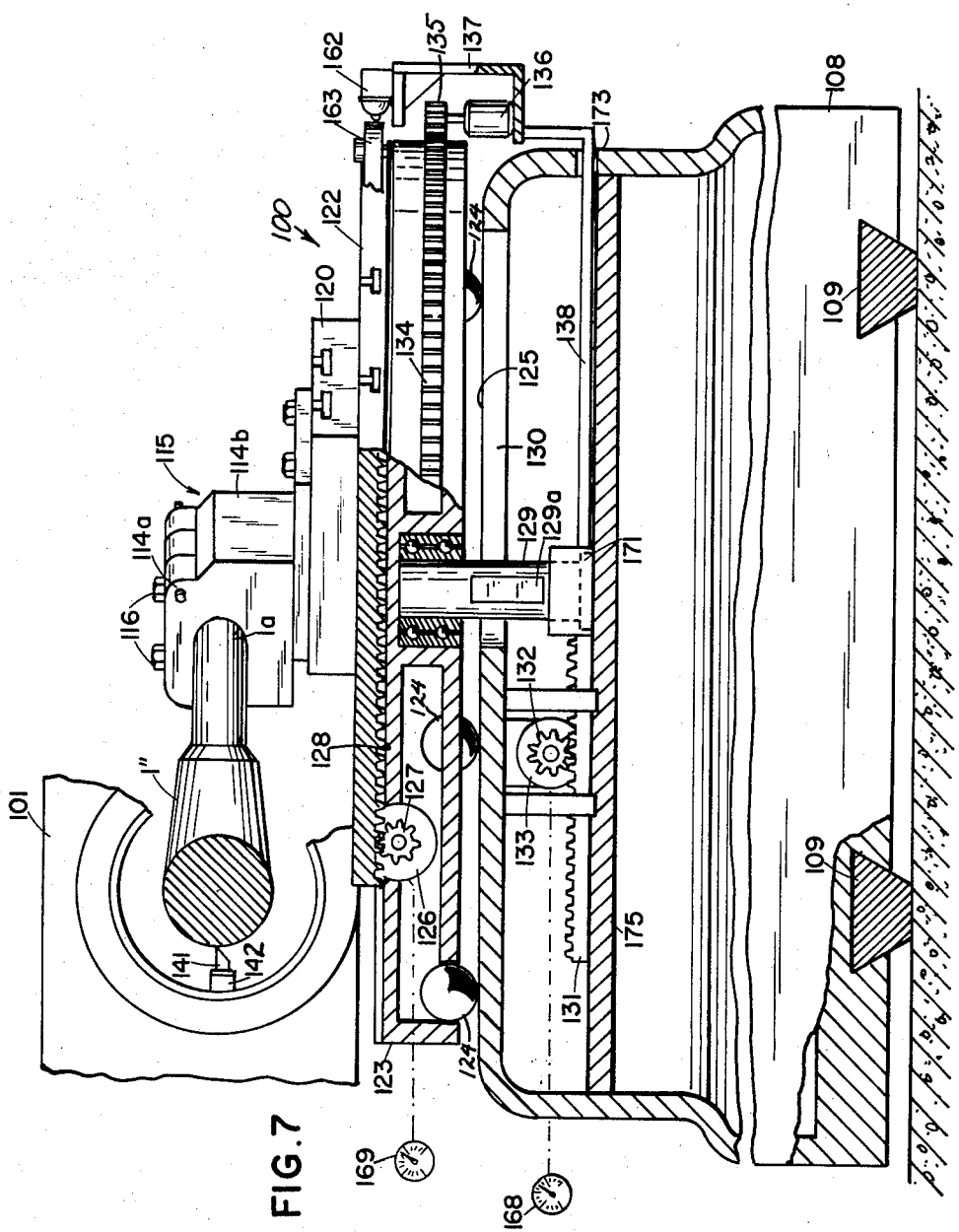
FIG. 7 is a view similar to FIG. 4 but partly broken away, showing additional details of the construction of the apparatus.

The tool support 101, illustrated only schematically in FIGS. 3 and 7 but shown in detail in FIGS. 4–6, comprises a tool bit 141 clamped in a holder 142 which is radially shiftable within a ring gear 143 and is formed with arcuate ridges 144 along an exposed lateral surface thereof. The ring gear 143 is driven by a chain 145 from the sprocket wheel 146 of a shaft 147, connected to a motor 148 (shown in FIG. 3), and is maintained in position within the housing 149 of the tool support 101 by a set of idler gears 150a, 150b, 150c journaled in the housing 149 and engaging the ring gear 143 above and below a horizontal axial plane therethrough. Another ring gear 151 abuts the tool-carrying gear 143 laterally and is provided with teeth 152 extending between the camming ridges 144 for radially displacing the tool holder 142 upon a relative angular displacement of the gears 151 and 143. Gear 151 is supported by a set of rollers similar to the rollers 150a, 150b, 150c but not illustrated. Since gear 151 abuts the lateral surface of gear 143, the two gears will generally tend to rotate in unison; a differential drive 153 is employed to rotate the ring gears 151 and 143 relatively to each other and thus to adjust the radial position of the tool 141.

The differential drive 153 comprises a pair of bevel gears 154a, 154b, independently rotatable upon shafts 155a, 155b journaled in opposite walls of the housing 149, and a pair of planetary bevel gears 156a, 156b, meshing with both the sun bevel gears 154a, 154b, whose radial shafts are journaled in a ring gear 157 which acts as the usual planetary-gear support in a conventional differential. A spur gear 158 meshes with the gear 157 and is coupled with a handwheel 159 for manual adjustment of the cutting tool 141. The shaft 160 of the spur gear 158 is also coupled to an indicator 161 (FIGS. 4 and 6), adapted to provide a visual indication of the position of the tool, and to a servo-control system, schematically illustrated in FIG. 6, for automatically controlling the position of the cutting tool 141. The servo-control system includes a feeler or sensing unit 162, which may comprise a hydraulic master cylinder, operated by a cam 163 and a follower unit 164 controlled thereby for rotating the shaft 160 in accordance with the configuration of the cam. The latter is structurally shown in FIGS. 3, 4 and 7 to be bolted to the plate 122 and rotatable therewith, while the master unit 162 of the servo system is shiftable within guides 137 together with the turntable motor 136. The cam-operated control arrangement will be described in greater detail hereinbelow.

The tool-adjusting means described above with particular reference to FIGS. 5 and 6 operates as follows:

Ring gear 143 carrying the tool holder 142 is rotated via the chain 145 at any desired elevated speed and frictionally entrains the gear 151 for simultaneous rotation without angular displacement relative thereto. The motion of gear 151 is transmitted to the bevel gear 154a of the differential 153 via an idler gear 165 whereas the motion of gear 143 is transmitted by a suitably dimensioned reversing gear 166 and an idler gear 167 to the other bevel gear 154b of the differential so that this gear rotates in a sense opposite that of bevel gear 154a but with normally identical speed. Planet-carrier gear 157 thus remains stationary. A rotation of the shaft 160, however, either by hand-wheel 159 or by the servo system 162–164, will rotate the gear ring 157 and thus angularly shift the frictionally entrained ring gear 151 relative to the driven ring gear 143, thereby displacing the tool holder 142 of the latter radially toward or away from the workpiece 1. It will thus be apparent that, if shaft 160 is locked against rotation, the two ring gears will always rotate in unison even in the absence of mutual frictional entrainment.

The operation of the apparatus illusrated in FIGS. 3–7 will now be described with reference to the production of a mandrel 1 as illustrated in FIGS. 1 and 2. A slightly over-sized mandrel blank having the general configuration of mandrel 1 is clamped between the blocks 115 and 118 of the apparatus, as previously indicated, and the handwheel 140 of the machine is operated to shift the workpiece-support table 122 longitudinally until the center of the workpiece or blank is at least approximately aligned with the center of revolution of the tool 141 and the blank is substantially concentric with the ring gear 143 carrying the tool (FIGS. 5 and 6). The tool 141 is then fed radially inwardly by a suitable adjustment of the handwheel 159, until it engages the periphery of the workpiece 1 to the desired depth, and is simultaneously rotated about the center line of the workpiece by the motor 148 so as to trim the blank to its final diameter. With stud 129 previously adjusted by means of motor 133 to space it longitudinally from the center of revolution of the tool 141 by a distance equal to the radius of curvature of the monocentric arcuate portions 1b, 1c of blank 1, the operation of motor 136 is subsequently initiated to rotate the table 123 about the stud 129 together with the workpiece-support plate 122 and the blank 1 as the tool 141 orbits about the latter. The successive cross-sectional diameters of the blank 1, cut by the tool 141, are determined by the cam or template 163, which rotates with the workpiece-support plate 122, via the servo system 162–164 carried on bracket 137. A pair of position indicators 168 and 169 are provided on the panel of the machine (FIG. 4), shown carried by the housing of tool support 101, and are coupled with the servo motors 133 and 126, respectively controlling the position of the stud 129 and the table 122, to indicate the radius of curvature of the workpiece being machined and the position of the center of the latter. When the curved portion of the blank 1 has been machined and the slot 130 coincides with the plane of section S₁, the cylindrical portion 1a of the blank is disposed with its axis aligned with the orbital axis of the cutting tool and transverse to the cutting plane; at this point the table-rotating motor 136 is cut off. The carriage 108 supporting the table 123 is then displaced, via handwheel 110 or suitable automatic means known per se, transversely along rails 109 in a linear motion during continued rotation of the cutting tool 141. The cylindrical portion is thus cut to an appropriate diameter.

When it is desired to machine a mandrel (e.g. mandrel 1″ shown in FIG. 3) having two or more successive curved portions with predetermined centers of curvature, the first of these portions is machined as previously described, whereupon the stud 129 is shifted in slot 130 via motor 133 to a new position. The carriage 108 and the plate 122 are then displaced by means of handwheel 110 and motor 126, respectively, to relocate the center of the workpiece in coincidence with the geometric center of the tool orbit. The stud 129 is thus disposed at the predetermined center of curvature for the next portion of the workpiece. Again motor 136 is operated to rotate the table 123 and the latter portion of the workpiece is appropriately trimmed. In the case of relatively abrupt changes the discontinuous mode of machining may produce local bulges at the points of transition, e.g. as shown for the mandrel 1″ at 1e″ (see FIG. 3).

Figure 9:
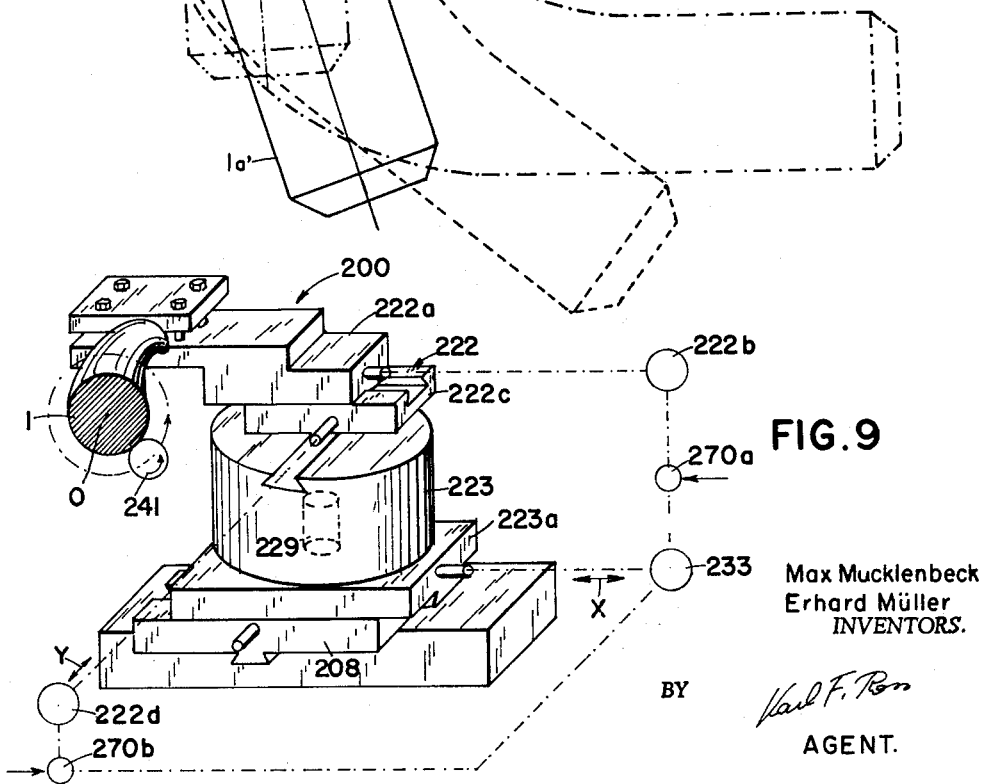
FIG. 9 is a diagrammatic perspective view of an apparatus according to another embodiment of the invention.
Figure 10:
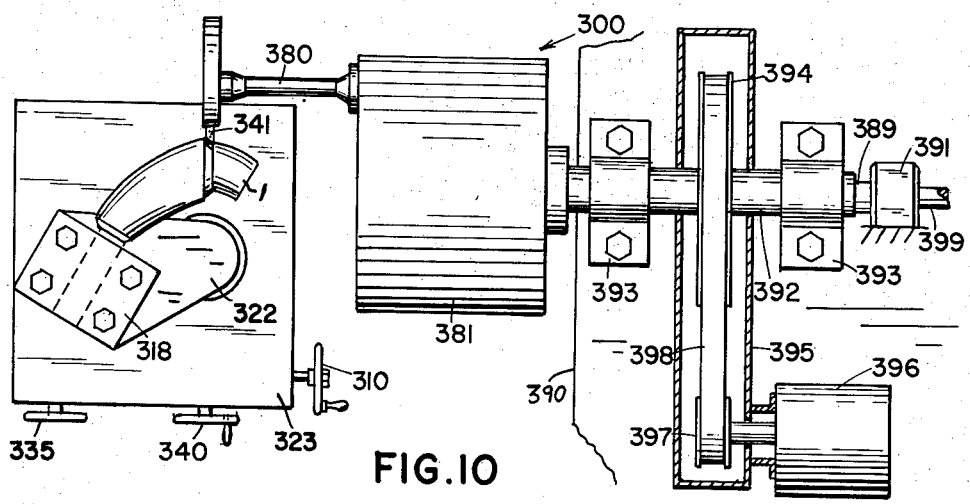
FIG. 10 is a plan view, partly in section, of an apparatus according to still another embodiment of the invention.
Figure 11:
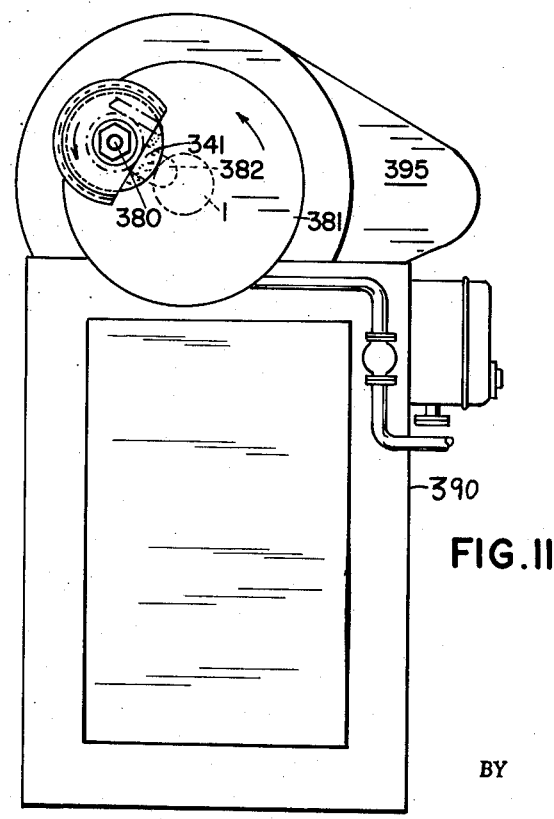
FIG. 11 is an end-elevational view of part of the apparatus of FIG. 10.
Figure 12:
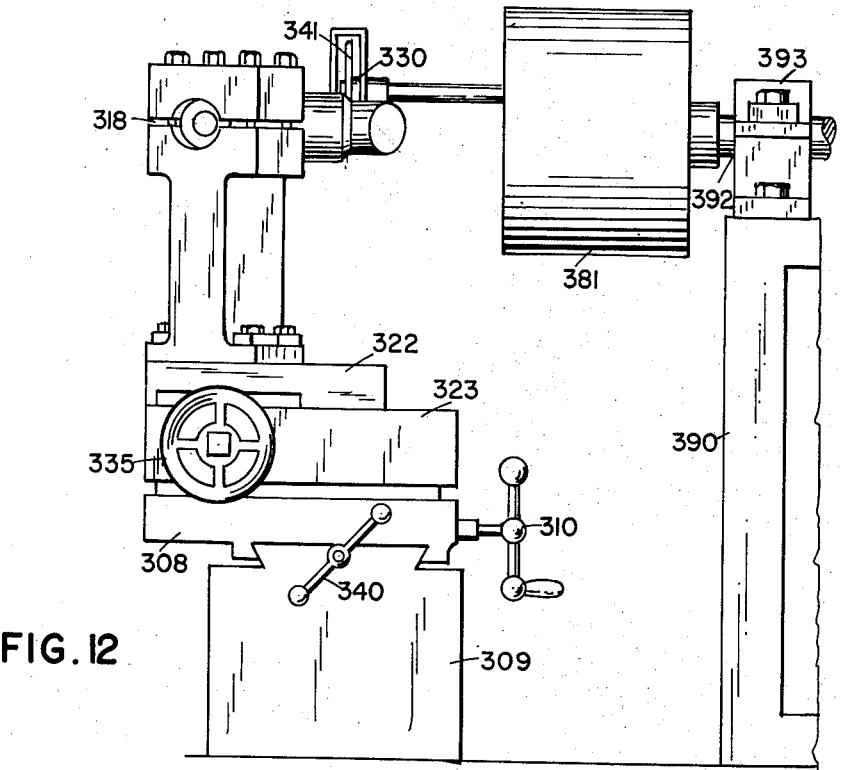
FIG. 12 is a side-elevational view of the apparatus.
Figures 13, 14:
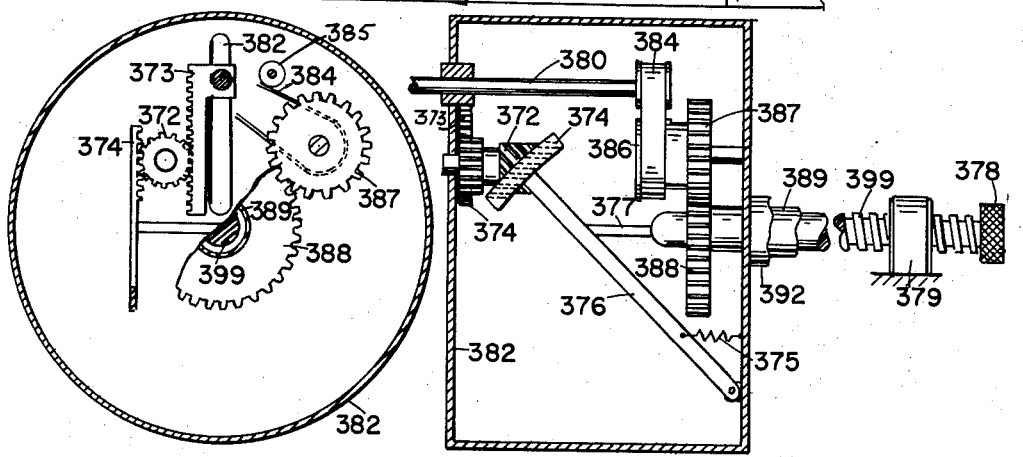
FIGS. 13 and 14 are enlarged cross-sectional views showing details of the last-mentioned apparatus.

In FIG. 8 we show another mandrel 1' with smooth contours having a cylindrical portion 1a', whose center of curvature is, of course, at infinity, and a pair of curved portions 1b' and 1c' whose centers of curvature are respectively shown at Pb and Pc. FIG. 9 diagrammatically illustrates an apparatus 200 for continuously machining such mandrels. The cylindrical portion of the mandrel is formed initially by a transverse displacement of the carriage 208, in the manner described above with reference to carriage 108, past an orbiting grinding tool 241 in the direction of arrow A as indicated for the dot-dot-dash showing in FIG. 8. When the straight or cylindrical portion 1a' of the mandrel has been completed, the latter is swung, on a revolving table 223, about the first center of curvature Pb in the cutting plane B (solid-line position of the mandrel) through an angle equal to the arc length of curved portion 1b' thereof, whereupon the pivot 229 of this table is displaced by motor 233 in a continuous motion through successive distance increments $dr$ for machining the arcuate portion 1c' of the mandrel (dashed-line showing in FIG. 8). A pair of mutually perpendicularly displaceable slides 222a, 222c constitute the support platform for the workpiece disposed on the turntable 223. Slides 222a and 222c are operated by respective servo motors 222b and 222d via suitable function generator controls 270a, 270b from the servo motor 233. Upon the displacement of a table 223 through an increment $dr$, the motor controls 270a and 270b generate components $-dr \cdot \cos \phi$ and $-dr \cdot \sin \phi$ of a compensating shift $-dr$ matching the displacement of the pivot 229, thereby maintaining the center of the workpiece in coincidence with the center of revolution of the tool throughout the machining process. During this process the distance R of the tool from its center of rotation O varies by increments $\Delta R$, corresponding to the change in the cross-sectional radius of the workpiece, upon adjustment or under the control of template 163. Similar templates may also be used in lieu of the function generators 270a and 270b, e.g. as illustrated at 410a and 440a in FIG. 15, to produce the co-ordinated increments of compensating displacement $-dr \cdot \cos \phi$ and $-dr \cdot \sin \phi$ for the mass production of a series of identical mandrels.

Generally, the positions of successive centers of curvature may be expressed in terms of the distance $\Delta r$ between any two centers of curvature Pb, Pc and the angular displacement of the mandrel. If such mandrels are laid out in Cartesian coordinates the location of the original center of co-ordinates relative to subsequent positions of this center will be of interest. If the original center of co-ordinates is at O, this being the intersection of the abscissa X along the original radius of curvature and an ordinate Y perpendicular thereto, the original center of swing Pb of the workpiece is located on the axis X. After a swinging of the workpiece 1' from solid-line to dotted-line position through the angle $\phi$, the origin is disposed at O', this being the intersection of abscissa X' and ordinate Y' normal thereto.

The mutually perpendicularly displaceable slides 222a and 222c may be considered as serving to shift the workpiece relatively to the pivot 229 in directions parallel to the coordinate axes X and Y in all angular positions thereof. It should be noted that, while the co-ordinate system described has its origin at the geometrical center of section $S_1$, any other location along the plane of that section will be suitable. For the purpose of facilitating the design of mandrels of the foregoing type, it will be of interest to note that the values of $\Delta X$ and $\Delta Y$, which define increments of distance along the X' and Y' axes of the center of curvature Pc in the cutting plane, are respectively $\Delta r \cdot (1 - \cos \phi)$ and $\Delta r \cdot \sin \phi$. The design of templates generally similar to the template 163 for controlling the X and Y co-ordinates of the center of curvature is facilitated by the use of the four relationships given above.

Mandrels having complex configurations, e.g. with a peripheral curvature which does not conform to the curvature of its center line, may be machined with the apparatus described if the template controlling the position of the cutting tool is appropriately designed to, for example, vary the value of $\Delta R$ to produce an approximately straight portion of at least part of the mandrel while the latter is, nevertheless, swung about its pivot; this is true of the mandrel 1' shown in FIG. 8.

In FIGS. 10–14 we show an apparatus 300 for grinding mandrels of the aforedescribed type which operates along the lines of the apparatus of FIGS. 3–7. The mandrel 1 is supported in cantilever fashion by a single block 318 upon a rotary workpiece-support plate 322, which is journaled for rotation about a vertical axis on turntable 323. A handwheel 335 is employed to turn the plate 322 and the workpiece 1 carried thereby. As described with reference to the embodiment illustrated in FIGS. 3–7, the swinging pivot for plate 322 is shiftable transversely to the cutting plane on the carriage 308 via the handwheel 310, to align the center line of the workpiece 1 with the center of rotation of the tool, and in the cutting plane on the bed 309 via the handwheel 340 to set the radius of curvature. Since the displacements of the pivot by handwheels 310 and 340 are respectively along the Y and X axes of the mandrel, the center of curvature of the latter may be set on the machine at any location along or offset from the cutting plane; in the last-mentioned case the cross-sections of the mandrel transverse to its center line will be elliptical.

The tool of machine 300 is a grinding wheel 341 fixed at the end of a shaft 380 journaled in and projecting from a drum 381. The shaft 380 is radially shiftable in a slot 382 in the front wall of the drum and is provided with a pulley 383 driven via a belt 384, whose tension is maintained by an idler 385, by the drive pulley 386. The latter is journaled to the rear wall of the drum and is formed with a gear 387 meshing with a stationary sun gear 388. This gear is secured to a hollow shaft 389, which is fixed to a support table 390 at a block 391, carrying the main drive shaft 392 for the drum 381 secured thereto. Shaft 392 is journaled in a pair of pillow blocks 393 and carries a sheave 394, in a transmission housing 395, which is rotated by a motor 396 via another sheave 397 and a transmission belt 398 engaging both sheaves.

A rod 399, coaxial with the shafts 389 and 392, is threadedly engaged at its external extremity in a bushing 379 and is formed with a knurled adjusting head 378. The rod 399 is thus axially adjustable within the drum and bears upon a bar 377 rigid with a lever 376 which is biased toward the rod 399 by a spring 375 and is fulcrumed to the rear wall of the drum 381. The lever 376 is formed with a gear segment 374 which meshes with a spiral gear 372 whose pinion portion engages a rack 373 journaled to the grinding-wheel shaft 380. It will thus be apparent that rotation of drum 381 by motor 396 in, say, the counter-clockwise direction shown in FIG. 11, to revolve the grinding wheel 341 around the workpiece 1, will also impart a rotation in the same sense to the grinding-wheel shaft 380 so that the tool 341 rotates on its own axis simultaneously. The radial positioning of the tool 341 relative to the center line of the workpiece 1 to adjust the depth of cut is accomplished by axially displacing the rod 399 inwardly or outwardly and thereby rotating the pinion 372 to shift the shaft 380 away from or toward the axis of rotation of the drum 381. Machining of the workpiece 1 is performed in the same manner as previously described, with the exception that the realignment of the center of the workpiece with the center of revolution of the tool is accomplished manually.

Figure 15:
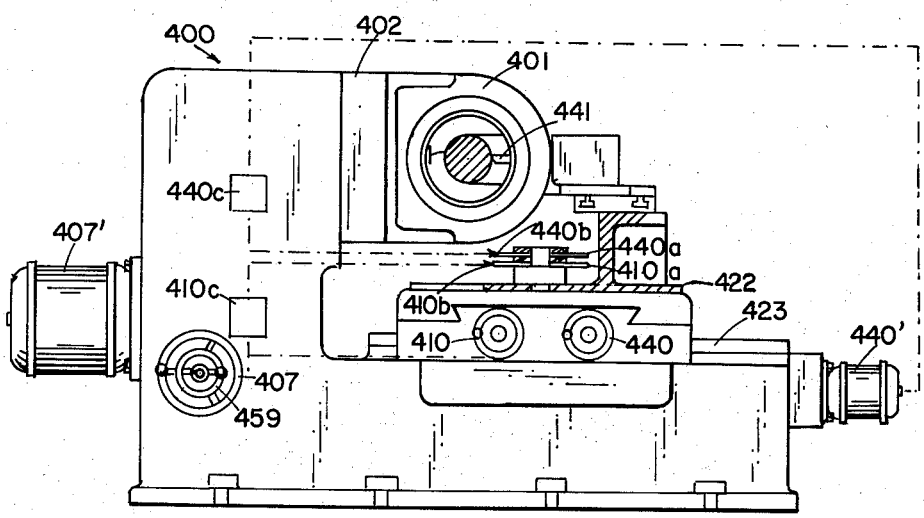
FIGS. 15 and 16 are side-elevational and top-plan views, respectively, of yet another embodiment according to the invention, including a control system shown somewhat schematically.
Figure 16:
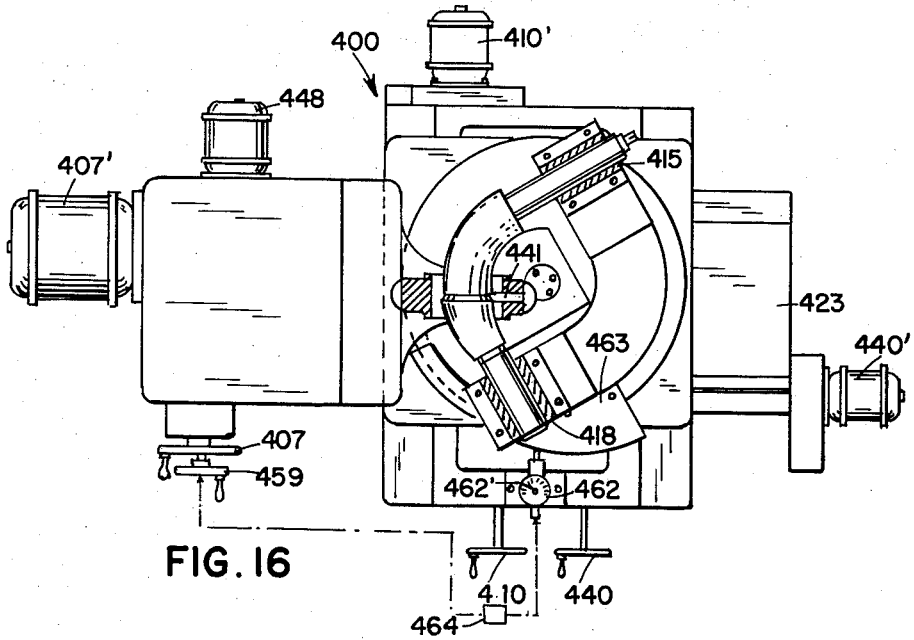

In FIGS. 15 and 16 there is illustrated another embodiment of the invention which combines features of the two embodiments previously described. In the machine 400 the tool-support ring 401 is vertically shiftable upon rails 402 by a handwheel 407 or a motor 407' while a motor 448 drives the tool bit 441, which is adjustable radially by a handwheel 459, as described with reference to FIGS. 3–7. In the present embodiment, however, the workpiece 1 is securede in clamp blocks 415, 418 on a support plate 422 whose pivot, as in the embodiment shown in FIGS. 10–14, is longitudinally shiftable along the X axis of the mandrel 1 in or parallel to the cutting plane along the bed 423 by a handwheel 440 and a conventional lead-screw motor 440' while being displaceable transversely to the cutting plane in the direction of the Y axis by a handwheel 410 and another lead-screw motor 410'. As indicated schematically in FIG. 15, the motors 440' and 410', respectively controlling the X and Y co-ordinates of the center of curvature, are operated by templates 440a, 410a secured to the rotary support plate 422 in step with the angular displacement of the workpiece 1 via servo sensing devices 440b, 410b respectively coupled through control units 440c, 410c to the motors 440' and 410'. Such servo mechanisms are well known. The support plate 422 also carries a template 463 which governs the position of cutting tool 441 to control the diameter of the mandrel machined by the tool for each angular position of the workpiece. A servo sensing feeler 462, which is also provided with an indicator dial 462' showing the position of the tool, bears on the template 463 and adjusts the location of the tool via a control unit 464 as descibed with reference to FIGS. 3–7. The machine tool 400, of course, functions similarly to the apparatus 200 or 300 previously discussed to produce the several types of mandrels necessary for bending pipes.

Although all of the constructions shown utilize cutting tools for processing the mandrels 1, it will be immediately clear that operations other than cutting may be carried out on the several types of apparatus described. The cutting tools 141, 241, 341 and 441 may be replaced, for instance, by suitable electrode means for sputtering a hardening or corrosion-resistant layer uniformly onto the surface of a mandrel body or for repairing damaged mandrels.

Other modifications and variations, considered to be within the spirit and scope of the appended claims, will be readily apparent to persons skilled in the art.

We claim:

1. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body in a substantially radial plane of said curved path, said pivoting means including a first formation fixed to said support means and a mating second formation slidable on said base along a linear track lying substantially within said plane, drive means for displacing said tool along said orbit in engagement with the periphery of said body, and adjusting means for varying the distance between said fulcrum and the orbital center of said tool in the course of a machining operation by displacing said second formation along said track relatively to said base, said holder being mounted on said support means for relative compensating displacement parallel to said track whereby said body is maintained centered with reference to said orbit.

2. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, drive means for displacing said tool along said orbit in engagement with the periphery of said body, first adjustment means operable in the course of a machining operation for displacing said pivoting means together with said support means on said base, and second adjustment means coupled with said means for imparting to said holder a compensating displacement relative to said support means whereby said body is maintained centered with reference to said orbit.

3. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, said fulcrum defining a pivotal axis substantially within said plane, drive means for displacing said tool along said orbit in engagement with the periphery of said body, first adjustment means operable in the course of a machining operation for linearly displacing said pivoting means together with said support means on said base substantially within said radial plane, and second adjustment means coupled with said first adjustment means for imparting to said holder a linear compensating displacement relative to said support means substantially parallel to said plane whereby said body is maintained centered with reference to said orbit.

4. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, said fulcrum defining a pivotal axis substantially within said plane, drive means for displacing said tool along said orbit in engagement with the periphery of said body, first adjustment means operable in the course of a machining operation for linearly displacing said pivoting means together with said support means on said base substantially within said radial plane, second adjustment means coupled with said first adjustment means for imparting to said holder a compensating displacement relative to said support means with components substantially parallel and transverse to said plane whereby said body is maintained centered with reference to said orbit, and third adjustment means for shifting said holder relatively to said support means in a direction substantially perpendicular to said radial plane whereby a substantially straight cylindrical portion is formed on said body.

5. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, drive means for displacing said tool along said orbit in engagement with the periphery of said body, automatic control means, first adjustment means responsive to said control means for displacing said pivoting means together with said support means on said base, and second adjustment means responsive to said control means for imparting to said holder a compensating displacement relative to said support means whereby said body is maintained centered with reference to said orbit.

6. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, said fulcrum defining a pivotal axis substantially within said plane, drive means for displacing said tool along said orbit in engagement with the periphery of said body, automatic control means, first adjustment means responsive to said control means for linearly displacing said pivoting means together with said support means on said base substantially within said radial plane, and second adjustment means responsive to said control means for imparting to said holder a compensating displacement relative to said support means substantially parallel to said plane whereby said body is maintained centered with reference to said orbit.

7. An apparatus for machining an arcuate body of round cross-section, comprising a base, a holder for said body, support means for said holder on said base, pivoting means swingably interconnecting said base and said support means for angularly displacing said body relatively to said base along a curved path having a fulcrum defined by said pivoting means, a tool carrier disposed at a location along said path, means on said carrier for guiding a tool in a circular orbit about said body within a substantially radial plane of said curved path, said fulcrum defining a pivotal axis substantially within said plane, drive means for displacing said tool along said orbit in engagement with the periphery of said body, automatic control means, first adjustment means responsive to said control means for linearly displacing said pivoting means together with said support means on said base substantially within said radial plane, second adjustment means responsive to said control means for imparting to said holder a compensating displacement relative to said support means with components substantially parallel and transverse to said plane whereby said body is maintained centered with reference to said orbit, and third adjustment means for shifting said holder relatively to said support means in a direction substantially perpendicular to said radial plane whereby a substantially straight cylindrical portion is formed on said body.

8. An apparatus as defined in claim 5 wherein said control means comprises at least one template rotatable together with said body and sensing means in contact with said template.

References Cited in the file of this patent

UNITED STATES PATENTS

| | | |
|---|---|---|
| 351,214 | Slade | Oct. 19, 1886 |
| 1,362,816 | Olson | Dec. 21, 1920 |
| 1,543,746 | Benton | June 30, 1925 |
| 1,713,892 | Dorin | May 21, 1929 |
| 2,394,789 | Lavoie | Feb. 12, 1946 |
| 2,725,776 | Hopkins | Dec. 6, 1955 |

FOREIGN PATENTS

| | | |
|---|---|---|
| 28,393 | Austria | May 10, 1907 |
| 199,455 | Austria | Sept. 10, 1958 |
| 394,373 | France | Jan. 21, 1909 |